US007034317B2

(12) United States Patent
Olszak et al.

(10) Patent No.: US 7,034,317 B2
(45) Date of Patent: Apr. 25, 2006

(54) METHOD AND APPARATUS FOR LIMITING SCANNING IMAGING ARRAY DATA TO CHARACTERISTICS OF INTEREST

(75) Inventors: Artur G. Olszak, Tucson, AZ (US); Chen Liang, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 208 days.

(21) Appl. No.: 10/323,552

(22) Filed: Dec. 17, 2002

(65) Prior Publication Data

US 2004/0113050 A1 Jun. 17, 2004

(51) Int. Cl.
*H01L 27/00* (2006.01)

(52) U.S. Cl. ................................ 250/458.1; 250/208.1

(58) Field of Classification Search ............ 250/458.1, 250/459.1, 559.04, 559.05, 559.06, 559.07, 250/461.1, 461.2, 208.1; 358/486; 359/368, 359/391

See application file for complete search history.

(56) References Cited

U.S. PATENT DOCUMENTS 4,288,821 A * 9/1981 Lavallee et al. ........... 358/3.07
4,760,385 A * 7/1988 Jansson et al. ............. 345/641
5,053,626 A * 10/1991 Tillotson ................. 250/458.1
5,159,642 A 10/1992 Kosaka
5,304,809 A * 4/1994 Wickersheim ........... 250/458.1
5,585,639 A * 12/1996 Dorsel et al. ............ 250/458.1
6,016,205 A * 1/2000 Silverberg et al. ........... 358/1.6
6,236,735 B1 5/2001 Bjorner et al.
6,522,774 B1 2/2003 Bacus et al.
6,586,750 B1 * 7/2003 Montagu et al. ......... 250/458.1
2002/0061127 A1 5/2002 Bacus et al.
2002/0090127 A1 7/2002 Wetzel et al.
2003/0030853 A1 2/2003 Makahira et al.
2003/0039384 A1 2/2003 Bacus et al.

(Continued)

FOREIGN PATENT DOCUMENTS

JP 11014550 1/1999

*Primary Examiner*—David Porta
*Assistant Examiner*—Faye Polyzos
(74) *Attorney, Agent, or Firm*—Birdwell & Janke, LLP

(57) ABSTRACT

A method and system for limiting the amount of image data to be captured by a scanning imaging array. A low-resolution preliminary image of an object is acquired. Data from the preliminary image is used to identify features of interest in the object or to perform other image analyses that do not require a high-resolution image. Thereafter a scanning imaging array may be used to acquire a high-resolution image of only limited areas of the object including the features of interest or of only limited object characteristics. In one embodiment, the preliminary image is acquired using a separate, linear scanning array extending laterally with respect to the scan direction of the scanning imaging array. In another embodiment, an under sampled portion of the imaging elements of the scanning imaging array, or detectors thereof, is used to pre-scan the object to produce the low-resolution preliminary image. In a third embodiment, the preliminary image is acquired using a single-axis, low-resolution imaging system to produce the low-resolution image. The data acquired from these embodiments may then be used to limit the high-resolution image data acquired from the scanning imaging array spatially in the scan or longitudinal direction, in the lateral direction, or in both the longitudinal and lateral directions, to areas of the object including features of interest. It may also be used to identify color, control the gain of array elements or perform other analyses.

80 Claims, 14 Drawing Sheets

U.S. PATENT DOCUMENTS

| | | | | |
|---|---|---|---|---|
| 2003/0103262 | A1* | 6/2003 | Descour et al. | 359/368 |
| 2004/0095641 | A1* | 5/2004 | Russum et al. | 359/391 |
| 2004/0223632 | A1* | 11/2004 | Olszak | 382/128 |
| 2005/0056767 | A1* | 3/2005 | Kaplan et al. | 250/208.1 |
| 2005/0088735 | A1* | 4/2005 | Olszak | 359/434 |
| 2005/0205757 | A1* | 9/2005 | Olszak | 250/208.1 |

* cited by examiner

METHOD AND APPARATUS FOR LIMITING SCANNING IMAGING ARRAY DATA TO CHARACTERISTICS OF INTEREST

BACKGROUND OF THE INVENTION

This invention relates to scanning imaging systems, particularly to methods and apparatus for limiting the amount of image data acquired by a scanning imaging array to data corresponding to object characteristics of interest.

In a relatively recent development, an array of miniature microscopes having corresponding optical detectors is used to scan one or a plurality of objects and produce a high-resolution electronic image thereof. Where the array is used to scan a single object, it is also known as an "array microscope", though the object, such as a biological specimen for pathological analysis, may have multiple features of interest. In contrast, multiple objects may comprise, for example, multiple elements of a micro-array of biological samples.

Typically, the microscope array comprises a two-dimensional array of high-resolution miniature microscopes whose lateral fields of view are much less than their microscope diameters. Consequently, successive rows in the scan direction are staggered in the perpendicular direction so that the full width of the object to be viewed is captured by contiguous images. Microscope arrays of this type are capable of diffraction-limited resolution as small as 0.5 microns; consequently, a much larger amount of data may be produced in a single scan than is necessary to image the feature of interest. For example, a microscope slide that is ten square centimeters in area will produce 4,000,000,000 image points; yet, the feature of interest in the object may be as small as one hundred square millimeters, requiring only 400,000,000 image points of data. Thus, a large amount of data that has no value is produced, which uses valuable storage capacity and processing time.

In addition, it is often desirable to determine the color of a specimen, or regions of a specimen, but not necessarily with the same, high-resolution required for structural analysis of the specimen. Also it may be desirable to control the gain of individual elements or selected groups of elements of the scanning microscope array based on the apparent density of the specimen at various locations, but not necessarily with the same, high-resolution required for structural analysis. Moreover, color detection and gain control element-by-element of the scanning microscope array is complicated, time consuming and expensive.

Accordingly, it would be desirable to have a way of limiting the amount of image data that is captured by a scanning microscope array to data corresponding to object features of interest. It would also be desirable to provide for color detection, adjustment of detector gain and other analyses without high-resolution imaging where unnecessary.

SUMMARY OF THE INVENTION

The present invention provides a method and system for limiting the amount of image data to be captured by a scanning imaging array. In a principal application, this is accomplished by acquiring a low-resolution preliminary image of an object, using the data from the preliminary image to identify features of interest in the object or to perform other image analyses that do not require a high-resolution image, and thereafter using a scanning imaging array to acquire a high-resolution image of only limited areas of the object including the features of interest. The low-resolution preliminary image may be acquired either by under sampling an array of imaging elements, or detectors thereof, or by using a separate low-resolution imaging system. In a first embodiment, the preliminary image is acquired using a separate, linear scanning array extending laterally with respect to the scan direction of the scanning imaging array. In a second embodiment, an under sampled portion of the imaging elements of the scanning imaging array, or detectors thereof, is used to pre-scan the object to produce the low-resolution preliminary image. In a third embodiment, the preliminary image is acquired using a single-axis, low-resolution imaging system to produce the low-resolution image. The data acquired from these embodiments is then used to limit the high-resolution image data acquired from the scanning imaging array spatially in the scan or longitudinal direction, in the lateral direction, or in both the longitudinal and lateral directions, to areas of the object including features of interest. The preliminary image data may also be used to determine the color of the areas of interest for which high-resolution image data is acquired, to adjust the detector gain for individual imaging elements in the scanning imaging array, and to determine other characteristics of areas of interest of the object without unnecessary high-resolution imaging.

The objects, features and advantages of the invention will be more readily understood upon consideration of the following detailed description of the invention, taken together with the accompanying drawings.

DETAILED DESCRIPTION OF THE INVENTION

In general, the present invention is directed toward a scanning imaging array system wherein, prior to acquiring a high-resolution image by scanning, a preliminary, low-resolution image of an object is acquired so as to identify areas of the object for which data is desired and thereby avoid gathering unnecessary image data from other areas of the object during acquisition of the high-resolution image data. While the invention is described with respect to a scanning miniature microscope array, particularly an array microscope, it may also be used in other types of scanning imaging array systems. The preliminary image may be acquired by various means, such as, for example, using a separate low-resolution linear scanning array that precedes a high-resolution scanning array; using an under sampled portion of a high-resolution, two-dimensional scanning array that scans the object just ahead of the rest of the array; first using a high-resolution array in a low-resolution mode to acquire a preliminary image during a first scan, then using it in its high-resolution mode during a second scan; or using a two-dimensional, low-resolution camera that produces one or more frames of data. The resolution of the preliminary image may be lower than the resolution of the subsequent image because only enough data is needed to identify areas, or features, that warrant high-resolution scanning so that the high-resolution scan data can be restricted to those areas. This reduces the amount of data that must be acquired to image the selected features and can thereby save scan time, memory and processing time. In addition, or alternatively, the preliminary image may be acquired based on a characteristic such as color, polarization or phase, the image data from which can be used either to limit, modify or supplement the high-resolution image data.

1. Microscope Arrays

Figure 1:
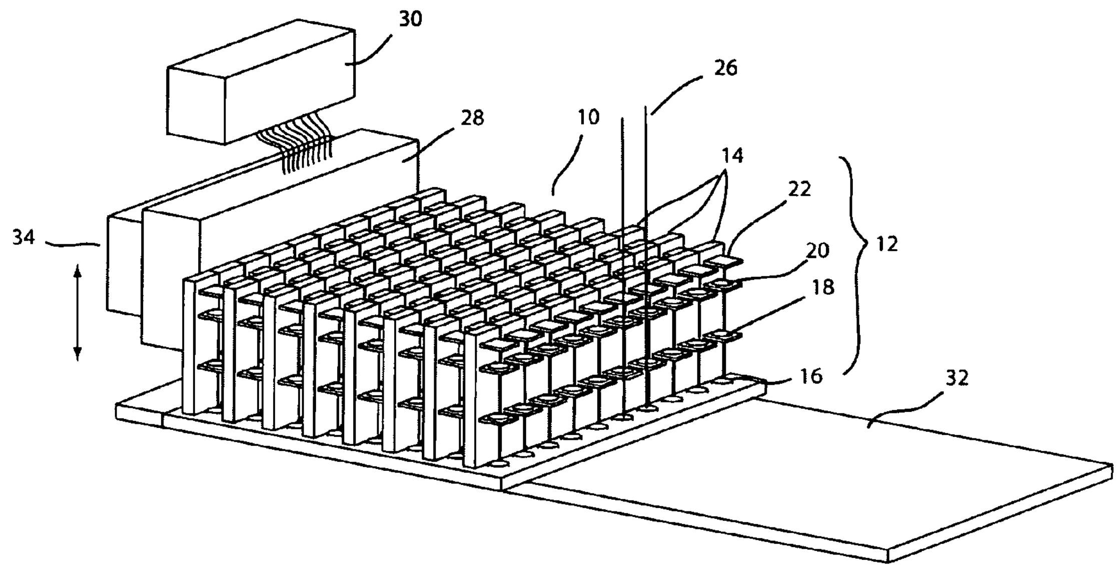
FIG. 1 is an illustration of a first exemplary embodiment of a scanning microscope array.

A first exemplary microscope array 10 is shown in FIG. 1. The microscope array 10 comprises an imaging lens system 12 having a plurality of individual imaging elements 14. Each imaging element 14 may comprise a number of optical elements, such as the elements 16, 18, 20 and 22. In this example, the elements 16, 18 and 20 are lenses and the element 22 is a detector, such as a CCD array. More or fewer optical elements may be employed. The optical elements are typically mounted on a vertical support 24 so that each imaging element 14 defines an optical imaging axis 26 for that imaging element.

The microscope array 10 is typically provided with a detector interface 28 for connecting the microscope to a data processor or computer 30 which stores the image data produced by the detectors 22 of the imaging elements 14. An object is placed on a carriage or stage 22 which may be moved beneath the microscope array so that the object is scanned by the array. The array would typically be equipped with an actuator 34 for moving the imaging elements axially to achieve focus. The microscope array 10 would also include an illumination lens system, as explained hereafter.

Figure 2:
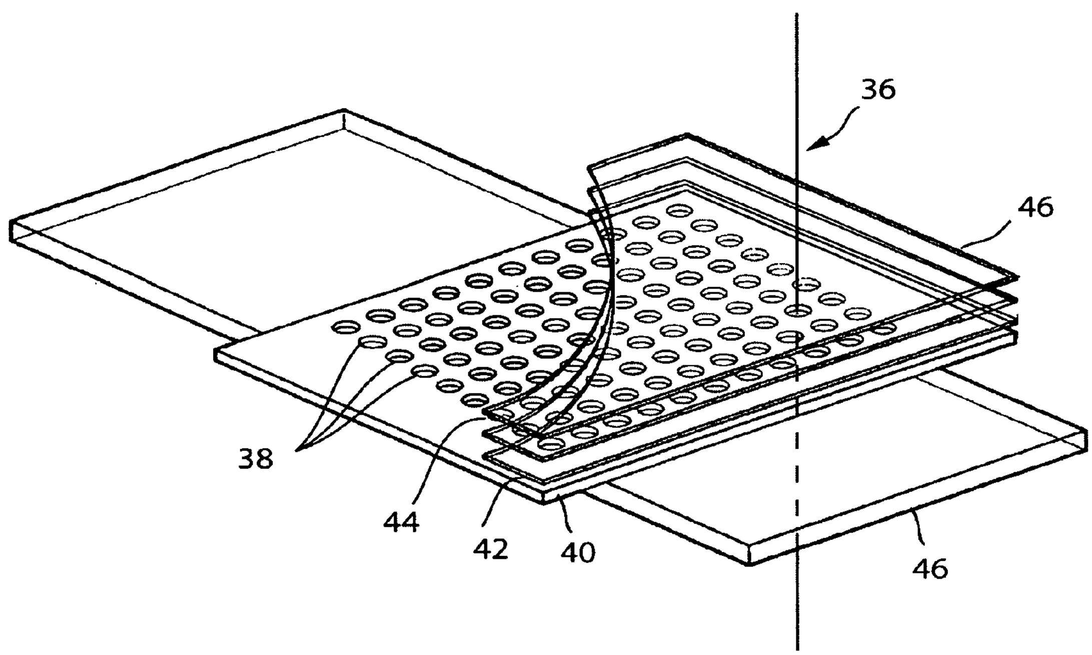
FIG. 2 is an illustration of a second exemplary embodiment of a scanning microscope array.

A second exemplary embodiment of a microscope array 36 is shown in FIG. 2. In the imaging lens system, a plurality of lenses 38 corresponding to individual imaging elements are disposed on respective lens plates 40, 42 and 44, which are stacked along respective optical axes 46 of the imaging elements. Detectors 48 are disposed above the lens plate 44. As in the case of the microscope array 10, the microscope array 36 may be employed to scan an object on a stage 50 as the stage is moved with respect to the array or vice versa.

Microscope arrays wherein the imaging elements are arranged to image respective contiguous portions of a common object in one dimension while scanning the object line-by-line in the other dimension are also known as an array microscope. Array microscopes may be used, for example, to scan and image entire tissue or fluid samples for use by pathologists. Individual imaging elements of array microscopes are closely packed and have a high numerical aperture, which enables the capture of high-resolution microscopic images of the entire specimen in a short period of time by scanning the specimen with the array microscope.

The detectors of array microscopes preferably are linear arrays of detector elements distributed in a direction perpendicular to the scan direction. As the imaging elements produce respective images that are magnified, each successive row of elements is offset in the direction perpendicular to the scan direction. This permits each imaging element to have a field of view that is contiguous with the fields of view of other appropriately positioned optical systems such that collectively they cover the entire width of the scanned object. The present invention is particularly suited for array microscopes; however, the present invention may be employed in other types of microscope arrays and multi-axis of imaging systems having a plurality of elements for imaging respective locations in space.

2. Pre-imaging

Figure 3:
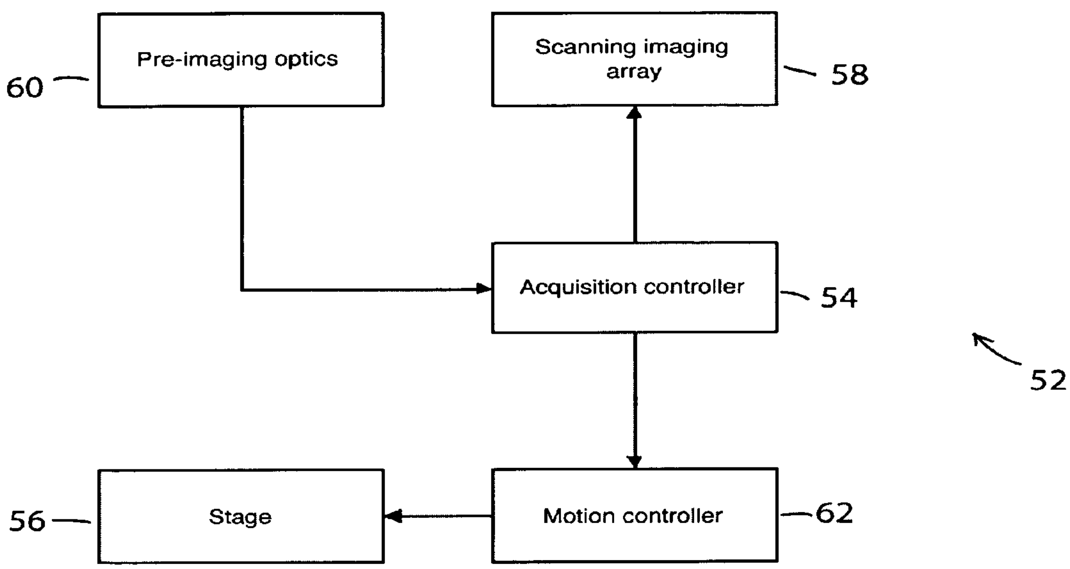
FIG. 3 is a general functional block diagram of an image data-limiting portion of a scanning microscope array according to the present invention.

Turning to FIG. 3, a block diagram 52 illustrates the general structure of a scanning microscope array system incorporating the acquisition of a preliminary image ("pre-imaging") in accordance with the present invention. The system comprises a data acquisition controller 54, a stage 56, a scanning microscope array 58, and pre-imaging optics 60. The pre-imaging optics may either be part of or distinct from the scanning microscope array, as discussed further hereafter. The data acquisition controller 54 operates the stage 56 to move the object to be imaged relative to the pre-imaging optics and scanning microscope array. A distinct motion controller 62 may also be provided, if necessary or desirable, to operate the stage. The stage position may be controlled and determined either on an open or a closed-loop basis.

The data acquisition controller 54 receives preliminary, low-resolution image data from the pre-imaging optics 60 and uses that data to control the scanning microscope array 58 and, if desired, the movement of the stage 56. That is, in response to the preliminary image data the data acquisition controller may choose to accept data only from certain of the elements of the scanning microscope array 58, or detectors thereof, to accept data only at certain times, or to accept data only when the object is in a certain position with respect to the scanning microscope array. It may control the stage position, speed or dwell time based on the preliminary data. In addition, the controller may set parameters such as the gain and offset of detectors in the elements of the scanning microscope array, the duration and intensity of illumination and the like.

3. Separate Pre-imaging

Figure 4:
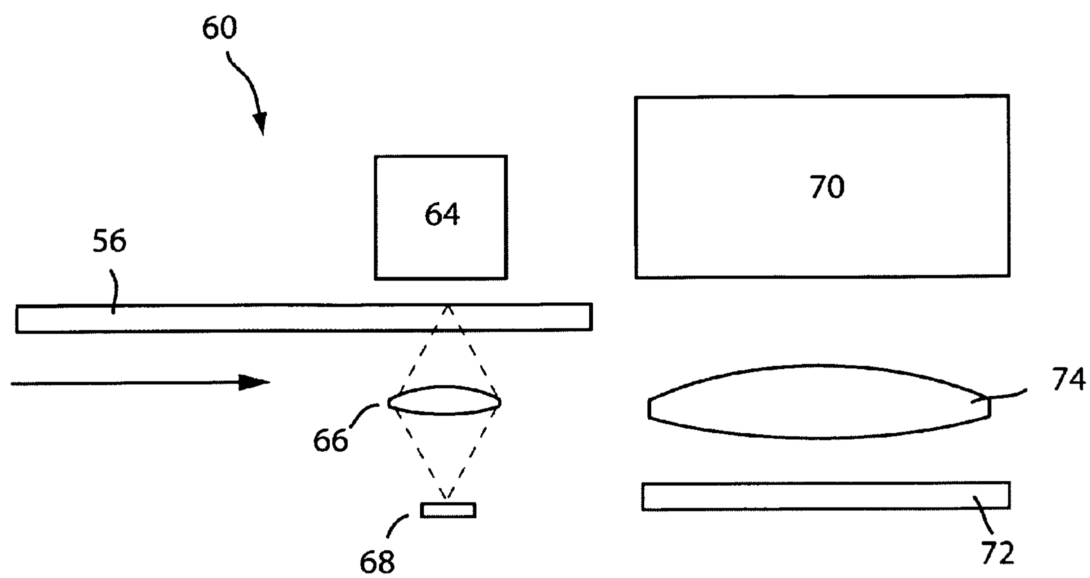
FIG. 4 is a side view of a first embodiment of a pre-imaging portion of an image data limiting system according to the present invention.
Figure 5:
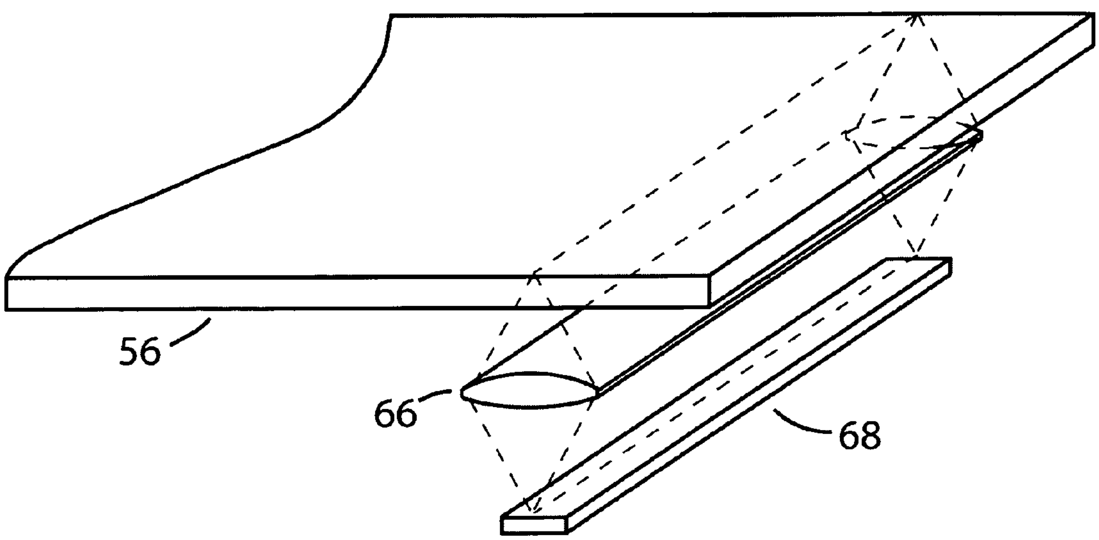
FIG. 5 is an isometric view of the pre-imaging system of FIG. 4.

Turning to FIGS. 4 and 5, in a preferred embodiment the pre-imaging optics 60 comprise a linear array of imaging elements that is distinct from the scanning microscope array 58 and that scans the object to be imaged in advance of the scanning microscope array as the stage 56 moves the object relative to the scanning microscope array. The linear array preferably comprises a light source 64, at least one imaging lens 66, and a plurality of detectors 68 arranged in a linear array perpendicular to the direction of scanning for producing one-dimensional representations of respective portions of the object within the field of view of the detector.

The scanning microscope array 58 preferably is a distinct assembly having a two-dimensional array of miniature microscopes 70, a light source 72 and illumination optics 74, as will be readily understood in the art. It is to be understood that various types of scanning microscope arrays may be used without departing from the principles of the invention. Arrays as described with respect to FIGS. 1 and 2 may be used, for example. Indeed, the invention is particularly advantageous when it is associated with an array microscope. However, the invention may also be used advantageously with one or two-dimensional scanning imaging arrays.

In any case, the resolution of the image captured by the pre-imaging optics may be much less than the resolution of the image captured by the scanning microscope array, because all that is required to limit the amount of data to be captured by the scanning array is to identify the border of features of interest with relatively low-resolution. In the embodiment of FIGS. 4 and 5, the pre-imaging lens is shown as a cylindrical lens, which produces only a one-dimensional image in the dimension of the scan direction. The one-dimensional image produced by the lens may be a relatively low-resolution image, plus the periodicity with which the image is captured as the object is scanned by the pre-imaging optics may be low so as to further limit the resolution of the complete object pre-image that is captured. In contrast, the individual elements of a scanning microscope array 70 are high-resolution optics with spacing that enables the capture of contiguous images, thereby enabling the array to capture a high-resolution image of any selected features of the object.

4. Limiting Image Data

Figure 6:
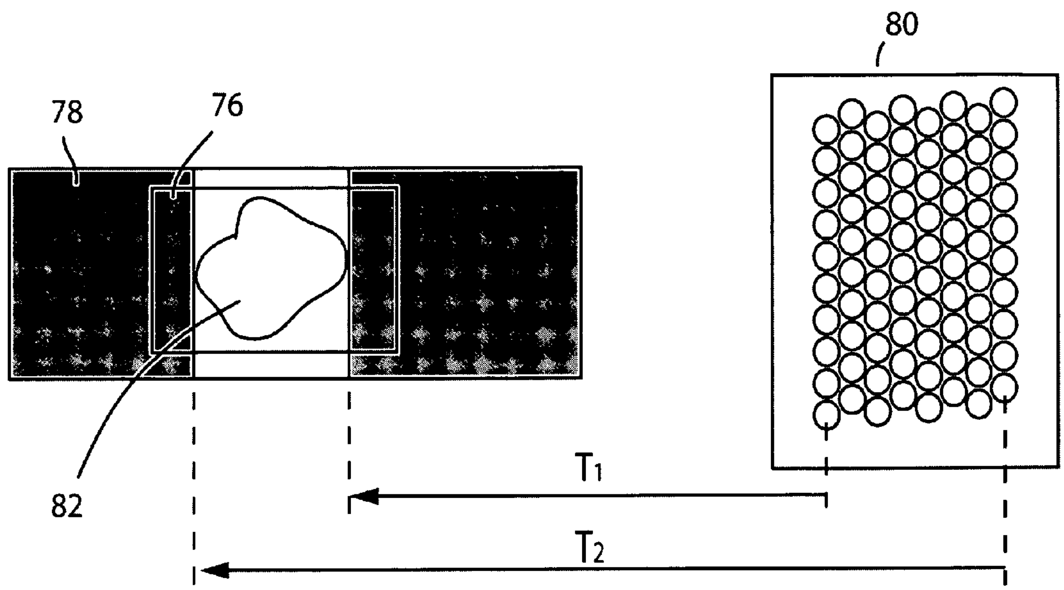
FIG. 6 is top view of an illustration of longitudinal selection of elements of a scanning microscope array based on pre-imaging according to the present invention.
Figure 7:
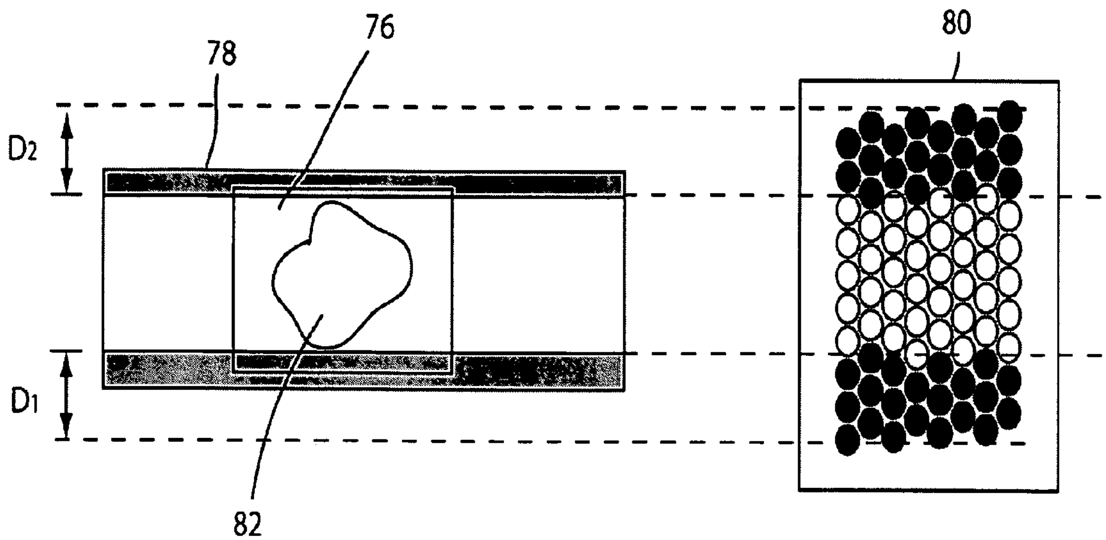
FIG. 7 is a top view of an illustration of lateral selection of elements of a scanning microscope array based on pre-imaging according to the present invention.
Figure 8:
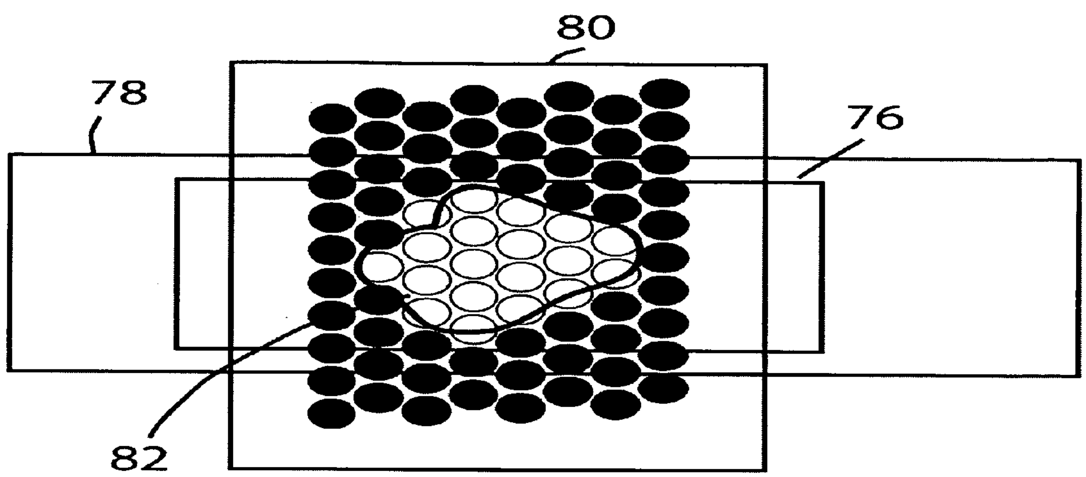
FIG. 8 is a top view of an illustration of combined longitudinal and lateral selection of elements of a scanning microscope array based on pre-imaging according to the present invention.

FIGS. 6, 7 and 8, illustrates the preferred ways in which scanning array image data may be limited as a result of pre-imaging. In FIG. 6, a specimen 76 is mounted on a slide 78 so as to be moved beneath a scanning array 88 by a stage, as explained with respect to FIG. 3. In this case, the only feature of interest in the specimen is identified by the bounded area 82. By advancing the stage according to a known velocity function, based on pre-imaging data the data acquisition controller 54 can determine a time $T_1$ before which no data is to be captured from the scanning array 78 and a time $T_2$ after which no data is to be captured, while capturing data between those two times in order to image the feature of interest in the specimen. Thus, for example, the data acquisition controller would "turn on" the scanning array at time $T_1$ and turn it off at time $T_2$. As a result, the image data is temporally limited to that which is captured between those two times.

Rather than rely on time, which may be subject to unpredictable velocity variations, the position of the object may be monitored as it passes by the pre-imaging system, for example, by a position encoder attached to the stage 56, so that, based on the relative positions of the pre-imaging optics and the scanning microscope array, the elements of the array can be turned on when the areas or features of interest are thereafter positioned in their respective fields of view, then turned off when they pass out of those fields of view. That is, the first row $R_1$ of the array 80 is turned on when the leading boundary 82*a* of object 82 reaches position P1 and the last row $R_n$ of the array 80 is turned off when the trailing boundary 82*b* of the object passes point P2. Indeed, no row between the first row $R_1$ and the last row $R_n$ need be turned on until the leading boundary 82*a* reaches it, and after the trailing boundary 82*b* passes a row it may be turned off.

In FIG. 7, the pre-imaging data is used to limit the lateral extent of the data that is captured. Thus, for example, where the maximum lateral extent of the feature of interest lies a distance $D_1$ in from one side of the scanning array 80 and a distance $D_2$ from the other side, as determined by the data acquisition controller 54 from pre-imaging data, only those array elements 82 inside those boundaries will be used to capture scanning array image data. Thus, the image data is spatially limited to that which is captured between those two boundaries.

In FIG. 8, both longitudinal and lateral limiting are applied to the scanning image data. Moreover, rather than employ fixed times or positions $T_1$, $P_1$ and $T_2$, $P_2$ and fixed boundaries $D_1$ and $D_2$, for every array element, the individual elements are addressed based on a low-resolution profile of the features of interest derived by the data acquisition controller from the pre-imaging data. That is, the controller determines which elements across the lateral extent of the scanning array 80 are to be turned on and when to turn them on and off so as to capture scanning data that is largely within the boundary of a feature of interest. This has the advantage not only of limiting data to that which is captured between some start time or position and some stop time or position, and between two outer boundaries, but also enabling data to be limited essentially to areas within one or more distinct features of interest in a specimen, thereby greatly reducing the amount of data to be stored and processed. Moreover, where the data is read out of the scanning array row-by-row, limiting the lateral extent of the image to be captured enables the total image data to be acquired faster.

For example, in the case of the embodiment described in FIGS. 4 and 5, the linear array of detectors 68 produces data that can be used to identify lateral as well as longitudinal boundaries, so both lateral and longitudinal image data limiting can be applied. However, since the cylindrical lens 66 only images in the longitudinal direction, more distinct lateral boundaries can be identified if an array of individual two-dimensional lenses, such as spherical lenses, corresponding to respective detectors in array 68 are provided rather than a cylindrical lens.

The pre-imaging data used to limit the scanning array image data that is captured may be acquired by separate pre-imaging optics, as described above with respect to FIGS. 4 and 5, or by other types of pre-imaging devices, such as those described hereafter, without departing from the principles of the invention.

5. Integrated Pre-imaging

Figure 9:
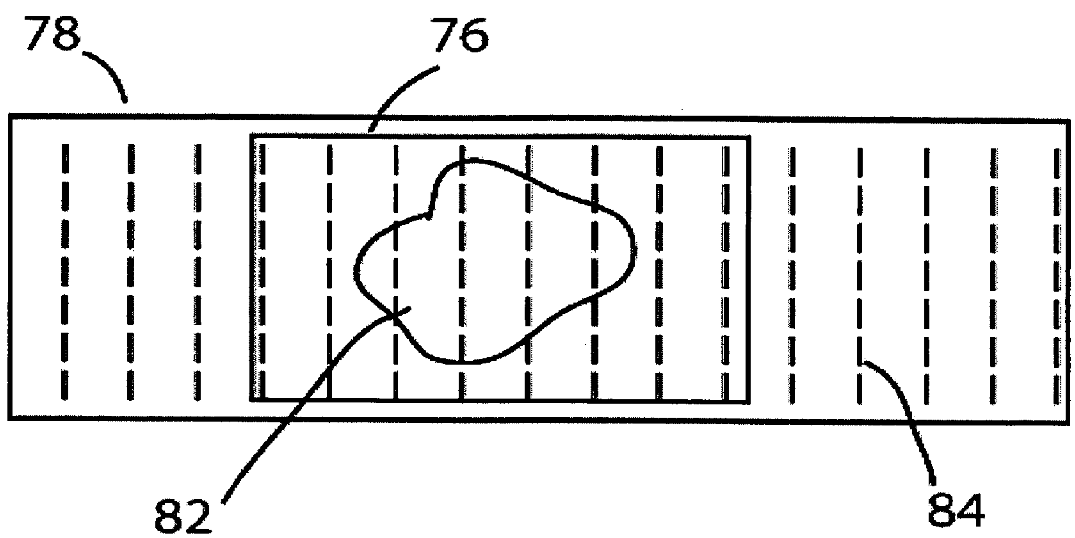
FIG. 9 is a top view of an illustration a second embodiment of a pre-imaging portion of an image data limiting system according to the present invention.

Rather than provide separate pre-imaging optics, it may be desirable to accomplish pre-imaging by using one or more rows of elements of the scanning microscope array to do pre-imaging. In this case, the leading row, or a plurality of the first rows to reach the object during a scan, are used to obtain the pre-scanning data. According to one embodiment, only a lateral sampling of the scanning microscope array elements is used and they are sampled at a low scan rate, as shown by the spaced linear element images 84 in FIG. 9. According to another embodiment, the individual linear detector arrays of all of the elements of the imaging array, at least along a given row of elements, are under sampled. In either case, the spatial frequency and resolution of the object image that is captured by the pre-imaging is relatively low. Thus, the pre-imaging mechanism is integrated with the microscope scanning array.

Rather than use only one row of elements of the scanning microscope array to pre-image the object by scanning just ahead of the rest of the array, a multiple pass approach may be used. In this case, the entire scanning microscope array first scans the object in a low-resolution mode, as described above, then rescans the object at high-resolution, acquiring data only for those areas that have been identified from the preliminary image data.

6. Snapshot Pre-imaging

Figure 10:
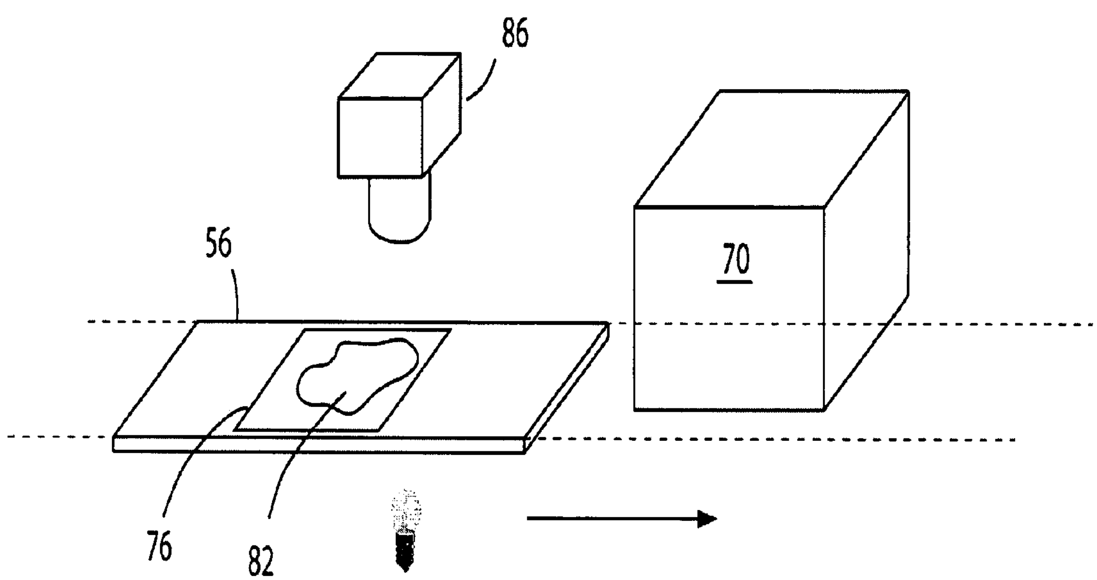
FIG. 10 is an isometric view of a third embodiment of a pre-imaging portion of an image data limiting system according to the present invention.

Another pre-imaging approach is shown by the embodiment of FIG. 10. In this case, an image of the entire object, or a region of the object, is captured by a by a single axis, relatively low-resolution imaging system 86 as the object is advanced by the stage toward the scanning microscope array 70. Where the region of the object does not include all of the features of interest, several such images may be needed. Because of the low-resolution of the single axis imaging system, the resulting pre-image has a low spatial frequency. The resulting pre-image is then used by the data acquisition controller to limit the data captured by the scanning microscope array as described above.

7. Pre-imaging Modes

Although pre-imaging has been described above in terms of imaging of intensity variations of the object, the invention contemplates other pre-imaging modes which may be based on color, polarization, interference patterns, fluorescence, magnetic effects, mechanical features or other measurable characteristics of the specimen to be scanned. The data acquired from these various modes may then be used, as described above, to select regions of interest to be scanned. The data may also be used to characterize or alter the high-resolution image so as to highlight or otherwise identify or distinguish important features or characteristics of the high-resolution image acquired from the high-resolution scan.

For example, it is common in microscopy to stain a specimen with one or more colors to highlight, and thereby identify, certain features of the specimen when viewed through a microscope. According to the present invention, the pre-imaging optics may include color-sensitive detectors so as to detect color variations in the specimen due to such stains. So, rather than using monochromatic intensity variations to identify a region of interest, the acquisition controller, or some other image processing computer associated therewith as is commonly understood in the art, may identify regions of interest based on color, intensity variations or both. Moreover, depending on the dyes that are used, it may not be necessary to perform three-color pre-imaging. Thence, the regions of interest of the specimen may be identified using only one- or two-color detection, thereby reducing the pre-imaging data acquisition time and thence the scan time in the case of scanning pre-imaging optics.

In addition, pre-imaging can be used to reduce the number of wavelengths required to be detected during high-resolution scanning in order to produce full color images. That is, limited color information acquired during high-resolution scanning may be supplemented by more complete color information acquired during low-resolution pre-imaging to reconstruct a full color image without the loss of any significant information. The additional color information may be provided by acquiring a preliminary image at a wavelength that is in addition to the wavelengths used in acquiring the high-resolution image, or by acquiring the preliminary image in full color.

For example, where a specimen has been dyed with two "standard" colors, as is common in microscopy, it may not be satisfactory to acquire the high-resolution image in only those two "standard" colors because in practice the dyes vary in intensity and hue. To ensure that the high-resolution image appears to have the same color distribution as it would have if viewed through a purely optical microscope, more information is needed than can be acquired at two "standard" wavelengths. The additional color information can be provided by acquiring a preliminary image at a third wavelength and using that additional information to construct a true full color high resolution image. While some color resolution is lost, it is not ordinarily significant; more importantly, data can be acquired faster by not having to perform a high-resolution scan of the specimen at three distinct wavelengths.

Figure 11:
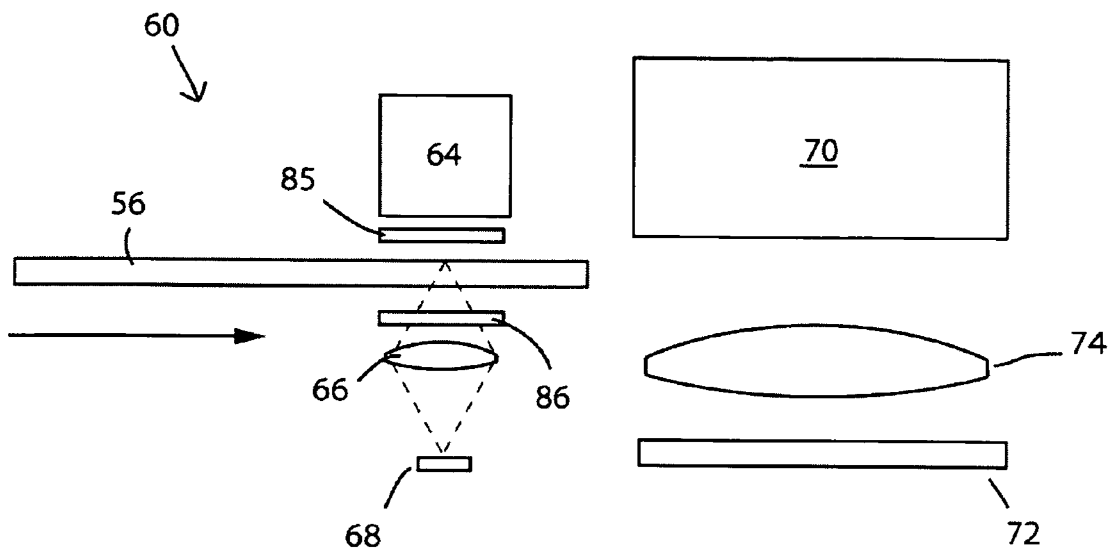
FIG. 11 is an illustration of an exemplary embodiment of a scanning microscope array employing polarization analysis in pre-imaging.

To distinguish features of the specimen based on polarization of the light emitted there from, the pre-imaging optics may, for example, include one or more polarizers 85 and analyzers 86, as shown in FIG. 11.

Figure 12:
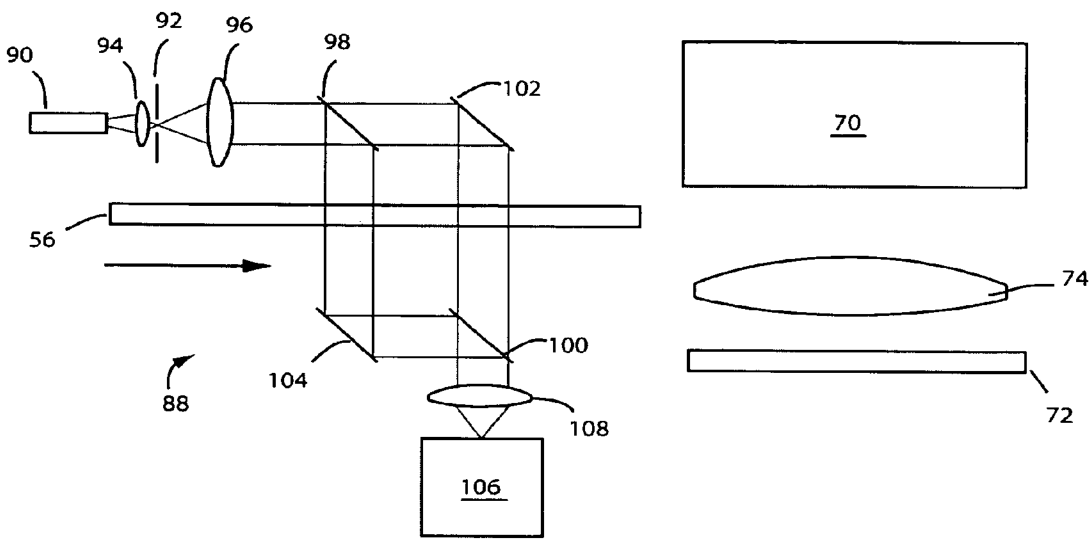
FIG. 12 is an illustration of an exemplary embodiment of a scanning microscope array employing interferometric pre-imaging.

To distinguish the specimen using interference patterns, standard interferometric techniques may be used, such as, for example, obtaining a preliminary image of the specimen using a Mach-Zender interferometer 88, as shown in FIG. 12. The interferometer may comprise, for example, a source of coherent light, typically a laser 90, a spatial filter 92 and a focusing lens 94; a collimating lens 96 for producing plane waves; a pair of beam splitters 98 and 100; a pair of mirrors 102 and 104; a camera 106; and a lens 108, for localizing the interference pattern at the image plane of the camera. The two mirrors and two beam splitters produce one beam that passes through the specimen and one which does not pass through the specimen. The two beams are then recombined so as to interfere with one another. The interference pattern produced thereby can then be used to identify regions of interest based on phase or thickness.

Figure 13A:
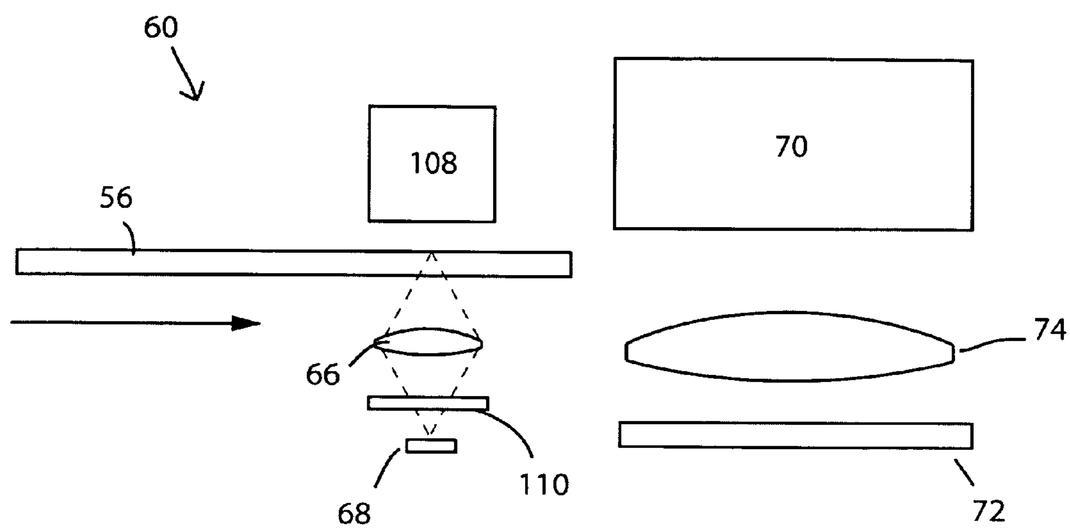
FIG. 13*a* is an illustration of an exemplary embodiment of a scanning microscope array employing fluorescence in pre-imaging.
Figure 13B:
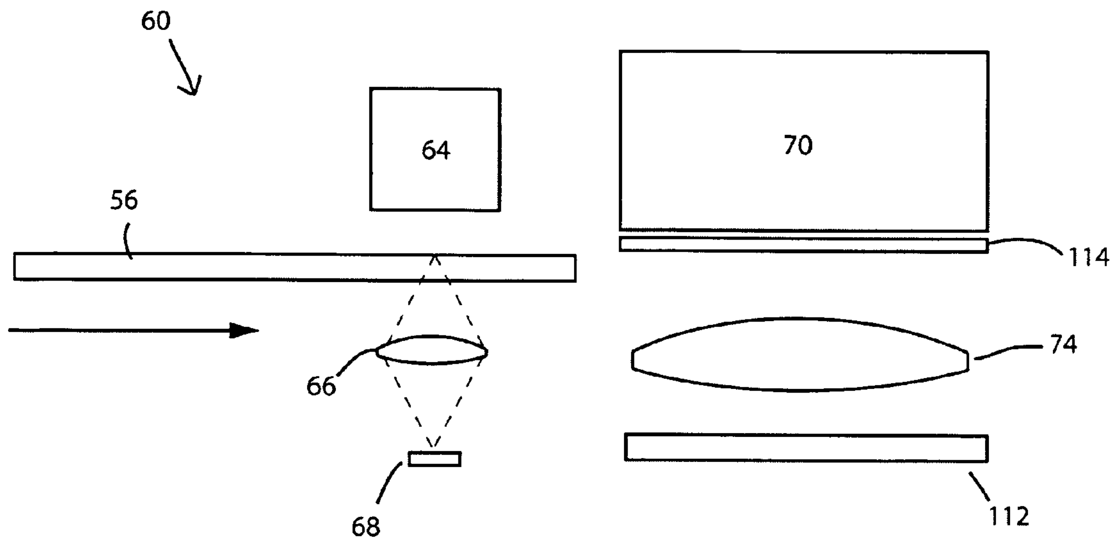
FIG. 13*b* is an illustration of an exemplary embodiment of a scanning microscope array employing fluorescence in high-resolution imaging.

Fluorescence microscopy may be used either in the pre-imaging or the high-resolution scanning. In fluorescence microscopy molecules of a specimen are typically selectively "tagged" with a molecule that, in response to excitation light a first wavelength, fluoresces at a second wavelength. The specimen is then illuminated by light at the excitation wavelength while the image thereof is viewed through a microscope at the second wavelength. Often, the specimen is actually scanned point-by-point simultaneously with the illuminating excitation light and a scanning microscope that images each point on a photo detector to accumulate an image of the specimen at the wavelength of fluorescence. FIGS. 13*a* and 13*b* show examples of the use of fluorescence microscopy for pre-imaging and high-resolution scanning, respectively. In FIG. 13*a*, the light source 108, which may, for example, be a high intensity conventional source with distinct emission lines or may be a laser, produces a first wavelength of light that causes tagged molecules in the specimen to fluoresce, and an optical band pass filter 110 limits the light that reaches the detector array to light having the fluorescence wavelength. Similarly, in FIG. 13*b* the light source 112 of the scanning optics produces the excitation wavelength and a filter 114 placed between the specimen and the scanning imaging array limits the light that reaches the array to light at the fluorescence wavelength.

In all of these cases, full color presentations of the image produced by high-resolution imaging may be provided so as to produce true color or to identify artificially by color different features or characteristics in the regions of interest that are scanned, based either on the preliminary image or the high-resolution image data, or both.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims that follow.

The invention claimed is:

1. A method for limiting the amount of image data acquired by a scanning imaging array of imaging elements to data corresponding to object features of interest, comprising:

producing a preliminary image of the object at a resolution that is low relative to the resolution capability of the imaging array so as to identify object features of interest; and based on the preliminary image, scanning limited areas of the object including the object features of interest with the scanning imaging array and acquiring data for those areas.

2. The method of claim 1, wherein producing the preliminary image is accomplished using the scanning imaging array.

3. The method of claim 2, wherein the array elements include one or more detectors and the number of array element detectors from which data is acquired when producing the preliminary image is reduced from the total number of array element detectors so as to reduce the resolution of the imaging array

4. The method of claim 2, wherein during scanning a subset of the scanning imaging array elements is selected from which to acquire image data based on the preliminary image.

5. The method of claim 4, wherein the subset of scanning imaging array elements is limited so as to acquire data only from selected areas of the object.

6. The method of claim 4, wherein during scanning the scanning imaging array is moved in a longitudinal scan direction and the subset of array elements is limited in lateral extent relative to the scan direction.

7. The method of claim 2, wherein during scanning the positions of the object relative to the scanning imaging array at which the scanning imaging array acquires image data are controlled based on the preliminary image.

8. The method of claim 7, wherein during scanning a subset of the imaging array elements is selected from which to acquire image data based on the preliminary image.

9. The method of claim 8, wherein the subset of array elements is limited so as to acquire data only from selected areas of the object.

10. The method of claim 8, wherein the subset of array elements is limited in lateral extent relative to the scan direction.

11. The method of claim 2, wherein during scanning the time period over which data is acquired from the imaging array is controlled based on the preliminary image.

12. The method of claim 1, wherein the preliminary image is acquired using a pre-scanning array separate from the scanning imaging array.

13. The method of claim 12, wherein relative motion is produced between the object and both the scanning imaging array and the pre-scanning array so that the pre-scanning array images the object a predetermined distance ahead of the scanning imaging array.

14. The method of claim 13, wherein during scanning by the scanning imaging array a subset of the scanning imaging array elements is selected from which to acquire image data based on low-resolution data acquired during pre-scanning.

15. The method of claim 14, wherein the subset of array elements is limited so as to acquire data only from selected areas of the object.

16. The method of claim 14, wherein the subset of array elements is limited in lateral extent relative to the scan direction.

17. The method of claim 13, wherein during scanning by the scanning image array the time period over which data is acquired from the scanning imaging array is controlled based on the preliminary image.

18. The method of claim 13, wherein during scanning by the scanning imaging array the positions of the object relative to the scanning imaging array at which the scanning imaging array acquires image data are controlled based on the preliminary image.

19. The method of claim 18, wherein during scanning by the scanning imaging array a subset of the scanning imaging array elements is selected from which to acquire image data based on image data acquired during pre-scanning.

20. The method of claim 19, wherein the subset of scanning imaging array elements is limited so as to acquire data only from selected areas of the object.

21. The method of claim 19, wherein the subset of array elements is limited in lateral extent relative to the scan direction.

22. The method of claim 1, wherein a microscope array is used as the scanning imaging array.

23. The method of claim 1, further comprising processing the preliminary image data so as to identify the limited areas to be scanned during scanning by the scanning imaging array.

24. The method of claim 1, wherein the preliminary image is produced based on detection of a plurality of wavelengths in light emerging from the object.

25. The method of claim 24, wherein the colors of the preliminary image are used to identify areas of interest for scanning the object.

26. The method of claim 1, wherein the preliminary image is produced by light emerging from the object with a predetermined polarization.

27. The method of claim 1, wherein the preliminary image is an interference pattern produced by interfering light emerging from the object with light illuminating the object.

28. The method of claim 1, wherein the object is illuminated with light of a first wavelength that causes fluorescence by the object at a second wavelength, and the preliminary image is produced by light at the second wavelength.

29. The method of claim 28, further comprising tagging selected structures of the object with molecules that fluoresce at the second wavelength in response to excitation at the first wavelength.

30. The method of claim 1, wherein during scanning the object is illuminated with light of a first wavelength that causes fluorescence by the object at a second wavelength, and the scanning is performed at the second wavelength.

31. The method of claim 30, further comprising tagging selected structures of the object with molecules that fluoresce at the second wavelength in response to excitation at the first wavelength.

32. The method of claim 1, wherein the preliminary image data is used to selectively set one or more parameters of individual imaging elements of the scanning imaging array.

33. The method of claim 32, wherein one parameter is detector gain.

34. The method of claim 32, wherein one parameter is detector offset.

35. The method of claim 1, wherein data acquired by the scanning imaging array contains less than all the color information needed to produce a full color image of the specimen, and color information from the preliminary image is used to supplement data from the scan so as to produce a full color image of the specimen.

36. A scanning imaging system, comprising:

a scanning imaging array of imaging elements;

a translation mechanism for producing relative movement between the scanning imaging array and an object to be scanned;

a pre-imaging mechanism for producing a preliminary image of all or a portion of the object; and a control mechanism for causing the pre-imaging mechanism first to produce a preliminary image of the object at a resolution that is low relative to the resolution capability of the imaging array so as to identify object features of interest, and then, based on the preliminary image, causing the scanning imaging array to scan limited areas of the object including the object features of interest and acquiring data for those areas.

37. The system of claim 36, wherein the pre-imaging mechanism includes selected elements of the scanning imaging array.

38. The system of claim 36, wherein the array elements of the scanning imaging array include one or more detectors and the pre-imaging mechanism includes a sub-sampling of the detectors of the scanning imaging array.

39. The system of claim 36, wherein the pre-imaging mechanism includes a portion of the scanning imaging array selected so as to produce the preliminary image at a resolution that is low relative to the resolution capability of the imaging array.

40. The system of claim 39, wherein the control mechanism causes the scanning imaging array first to scan the object with the selected portions to produce the preliminary image then to rescan the object at a higher resolution based on the preliminary image.

41. The system of claim 36, wherein the pre-imaging mechanism comprises a pre-imaging array separate from the scanning imaging array and disposed so as to scan the object with the scanning imaging array.

42. The system of claim 41, wherein the pre-imaging array comprises a linear array oriented laterally with respect to the scan direction of the scanning imaging array.

43. The system of claim 36, wherein the pre-imaging mechanism comprises a single axis imaging system disposed so as to image the object ahead of the scanning imaging array.

44. The system of claim 36, wherein the control mechanism causes the scanning imaging array to scan limited areas of the object by selecting one or more subsets of the elements of the scanning imaging array to acquire data.

45. The system of claim 44 wherein the subsets are selected based on the spatial position of the object relative to the scanning imaging array at the time of data acquisition.

46. The system of claim 36, wherein the scanning imaging array is a microscope array.

47. The system of claim 36, wherein the pre-image mechanism includes preliminary image detectors for a plurality of colors in light emerging from the object.

48. The system of claim 47, wherein the colors of the preliminary image are used to identify areas of interest for scanning the object.

49. The system of claim 36, wherein the pre-imaging mechanism includes a polarization analyzer for producing a preliminary image based on the polarization of light emerging from the object.

50. The system of claim 36, wherein the pre-imaging mechanism comprises an interferometer.

51. The system of claim 36, wherein the pre-imaging system includes a light source for illuminating the object with light of a first wavelength that causes fluorescence by the object at a second wavelength, and a light filter for producing the preliminary image with light emerging from the object at the second wavelength.

52. The system of claim 36, wherein the scanning array of imaging elements includes a light source for illuminating the object with light of a first wavelength that causes fluorescence by the object at a second wavelength, and a light filter for scanning light emerging from the object at the second wavelength.

53. The system of claim 36, wherein the control mechanism is adapted to use preliminary image data to selectively set one or more parameters of individual imaging elements of the scanning imaging array.

54. The system of claim 53, wherein one parameter is detector gain.

55. The system of claim 53, wherein one parameter is detector offset.

56. The system of claim 1, wherein the scanning array is adapted to acquire image data at less than all wavelengths needed to produce a full color image of the specimen, and the pre-imaging mechanism is adapted to produce additional image wavelength data to supplement data from the scanning array so as to produce a full color image of the specimen.

57. A method for acquiring image data representative of an object using a scanning imaging array of imaging elements, comprising:

producing a preliminary image of the object at a resolution that is low relative to the resolution capability of the scanning imaging array so as to acquire data regarding one or more selected object characteristics; and producing an image of the object at a resolution higher than the resolution of the preliminary image, based on the preliminary image and data acquired by scanning the object with the scanning imaging array.

58. The method of claim 57, wherein the preliminary image is produced based on detection of a plurality of wavelengths in light emerging from the object.

59. The method of claim 58, wherein the colors of the preliminary image are used to identify areas of interest for scanning the object.

60. The method of claim 57, wherein the preliminary image is produced by light emerging from the object with a predetermined polarization.

61. The method of claim 57, wherein the preliminary image is an interference pattern produced by interfering light emerging from the object with light illuminating the object.

62. The method of claim 57, wherein the object is illuminated with light of a first wavelength that causes fluorescence by the object at a second wavelength, and the preliminary image is produced by light at the second wavelength.

63. The method of claim 62, further comprising tagging selected structures of the object with molecules that fluoresce at the second wavelength in response to excitation at the first wavelength.

64. The method of claim 57, wherein during scanning the object is illuminated with light of a first wavelength that causes fluorescence by the object at a second wavelength, and the scanning is performed at the second wavelength.

65. The method of claim 64, further comprising tagging selected structures of the object with molecules that fluoresce at the second wavelength in response to excitation at the first wavelength.

66. The method of claim 57, wherein the preliminary image data is used to selectively set one or more parameters of individual imaging elements of the scanning imaging array.

67. The method of claim 66, wherein one parameter is detector gain.

68. The method of claim 66, wherein one parameter is detector offset.

69. The method of claim 57, wherein data acquired by the scanning imaging array contains less than all the color information needed to produce a full color image of the specimen, and color information from the preliminary image is used to supplement data from the scan so as to produce a full color image of the specimen.

70. A scanning imaging system, comprising:

a scanning imaging array of imaging elements;

a translation mechanism for producing relative movement between the scanning imaging array and an object to be scanned;

a pre-imaging mechanism for producing a preliminary image of all or a portion of the object; and a control mechanism for causing the pre-imaging mechanism first to produce a preliminary image of the object at a resolution that is low relative to the resolution capability of the imaging array so as to acquire data regarding one or more selected object characteristics, and then producing an image of the object at a resolution higher than the resolution of the preliminary image, based on the preliminary image and data acquired by scanning the object with the scanning imaging array.

71. The system of claim 70, wherein the pre-image mechanism includes preliminary image detectors for a plurality of wavelengths of light emerging from the object.

72. The system of claim 71 wherein the colors of the preliminary image are used to identify areas of interest for scanning the object.

73. The system of claim 70, wherein the pre-imaging mechanism includes a polarization analyzer for producing a preliminary image based on the polarization of light emerging from the object.

74. The system of claim 70, wherein the pre-imaging mechanism comprises an interferometer.

75. The system of claim 70, wherein the pre-imaging system includes a light source for illuminating the object with light of a first wavelength that causes fluorescence by the object at a second wavelength, and a light filter for producing the preliminary image with light emerging from the object at the second wavelength.

76. The system of claim 70, wherein the scanning array of imaging elements includes a light source for illuminating the object with light of a first wavelength that causes fluorescence by the object at a second wavelength, and a light filter for scanning light emerging from the object at the second wavelength.

77. The system of claim 70, wherein the control mechanism is adapted to use preliminary image data to selectively set one or more parameters of individual imaging elements of the scanning imaging array.

78. The system of claim 77, wherein one parameter is detector gain.

79. The system of claim 77, wherein one parameter is detector offset.

80. The system of claim 70, wherein the scanning array is adapted to acquire image data at less than all wavelengths needed to produce a full color image of the specimen, and the pre-imaging mechanism is adapted to produce additional image wavelength data to supplement data from the scanning array so as to produce a full color image of the specimen.

* * * * *